(12) United States Patent
Yokomitsu et al.

(10) Patent No.: US 9,639,766 B2
(45) Date of Patent: May 2, 2017

(54) CAMERA DEVICE, SERVER DEVICE, IMAGE MONITORING SYSTEM, CONTROL METHOD OF IMAGE MONITORING SYSTEM, AND CONTROL PROGRAM OF IMAGE MONITORING SYSTEM

(71) Applicant: Panasonic Corporation, Osaka (JP)

(72) Inventors: Sumio Yokomitsu, Tokyo (JP); Hirofumi Fujii, Kanagawa (JP); Takeshi Fujimatsu, Kanagawa (JP); Takeshi Watanabe, Kanagawa (JP); Yuichi Matsumoto, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 391 days.

(21) Appl. No.: 14/320,693

(22) Filed: Jul. 1, 2014

(65) Prior Publication Data

US 2014/0313415 A1    Oct. 23, 2014

Related U.S. Application Data (63) Continuation of application No. PCT/JP2013/000624, filed on Feb. 5, 2013.

(30) Foreign Application Priority Data

Feb. 6, 2012 (JP) ................................. 2012-022953

(51) Int. Cl.
*H04N 21/00* (2011.01)
*G06K 9/00* (2006.01)
(Continued)

(52) U.S. Cl.
CPC ....... *G06K 9/00979* (2013.01); *G06K 9/0061* (2013.01); *G06K 9/00248* (2013.01);
(Continued)

(58) Field of Classification Search
CPC ........... H04N 21/6375; H04N 21/6377; H04N 21/637; H04N 21/6379
(Continued)

(56) References Cited

U.S. PATENT DOCUMENTS 8,630,178 B2    1/2014 Nakagawa
2003/0231636 A1    12/2003 Berzosa et al.
(Continued)

FOREIGN PATENT DOCUMENTS

JP    2000-224569    8/2000
JP    2000-333156    11/2000
(Continued)

OTHER PUBLICATIONS

European Search Report in European Patent Application No. 13746485.5, mail date is Jun. 17, 2015.
(Continued)

*Primary Examiner* — Jeffery Williams
(74) *Attorney, Agent, or Firm* — Greenblum & Bernstein, P.L.C.

(57) ABSTRACT

An image monitoring system that efficiently utilizes a network band and decrease the processing load of a server is provided. A second image decision processor analyzes an extracted image transmitted from a monitoring terminal, and evaluates the quality (reliability) of the extracted image. A reliability decision unit outputs an individual ID of the analyzed extracted image to a load estimation unit when the numerical value from the analysis output by the second decision processor becomes less than the preset threshold. The load estimation unit estimates the server processor load of a server and the network load. A resend request unit controls the resend request for an individual ID output from the negative load estimation unit corresponding to the server processor load and the network load.

15 Claims, 7 Drawing Sheets

(51) Int. Cl.
*H04N 21/24* (2011.01)
*G06K 9/03* (2006.01)
*H04N 19/115* (2014.01)
*H04N 19/132* (2014.01)
*H04N 19/162* (2014.01)
*H04N 19/17* (2014.01)
*H04N 21/44* (2011.01)
*H04N 21/6332* (2011.01)
*H04N 7/18* (2006.01)

(52) U.S. Cl.
CPC ............ *G06K 9/036* (2013.01); *H04N 7/181* (2013.01); *H04N 19/115* (2014.11); *H04N 19/132* (2014.11); *H04N 19/162* (2014.11); *H04N 19/17* (2014.11); *H04N 21/2402* (2013.01); *H04N 21/2405* (2013.01); *H04N 21/44008* (2013.01); *H04N 21/6332* (2013.01); *H04N 7/183* (2013.01)

(58) Field of Classification Search
USPC ......................................................... 348/159
See application file for complete search history.

(56) References Cited

U.S. PATENT DOCUMENTS

| | | | |
|---|---|---|---|
| 2005/0041873 A1 | 2/2005 | Ii | |
| 2005/0063566 A1 | 3/2005 | Beek et al. | |
| 2007/0101173 A1* | 5/2007 | Fung | G06F 1/3209 713/300 |
| 2009/0080715 A1 | 3/2009 | van Beek et al. | |
| 2010/0067578 A1 | 3/2010 | Nakagawa | |
| 2011/0179320 A1* | 7/2011 | Quere | H04N 21/2383 714/712 |
| 2012/0039194 A1* | 2/2012 | Kure | H04N 19/30 370/252 |
| 2014/0098884 A1 | 4/2014 | Nakagawa | |

FOREIGN PATENT DOCUMENTS

| | | |
|---|---|---|
| JP | 2003-289528 | 10/2003 |
| JP | 2004-023794 | 1/2004 |
| JP | 2004-128948 | 4/2004 |
| JP | 2005-323046 | 11/2005 |
| JP | 2009-071733 | 4/2009 |
| JP | 2010-068452 | 3/2010 |
| JP | 2010-074366 | 4/2010 |
| JP | 2010-136221 | 6/2010 |
| WO | 03/034361 | 4/2003 |

OTHER PUBLICATIONS

Viola et al., "Rapid Object Detection using a Boosted Cascade of Simple Features", Accepted Conference on Computer Vision and Pattern Recognition, vol. 1 , 2001, pp. 511-518.

"Chapter 3 'Common Functions for Network Management' in 9 Part 'Network Management' in 5 Group of 'Knowledge Base'", Institute of Electronics, Information and Communication Engineers, www.ieice-hbkb.org/files/05/05gun_09hen_03.pdf, (2011), together with an English abstract of section 3-3-3.

International Search Report from PCT/JP2013/000624, mail date is Apr. 9, 2013.

* cited by examiner

| TRANSMISSION INFORMATION | DETAIL |
|---|---|
| FACE DETECTION SENSITIVITY SETTING (face-sens) | SENSITIVITY FOR FACE DETECTION<br>SENSITIVITY FOR DETECTING FACE FRAME IN CAMERA |
| TRANSMISSION TIME/DATE (X-SendTime) | TIME OF TRANSMISSION |
| DETECTION INFORMATION ⟨detected id=⟩ | IDENTIFICATION CODE (HumanCountID)<br>SAME IDENTIFICATION CODE IS GIVEN TO SAME FACE FRAME |
| REFERENCE TIME INFORMATION ⟨start-time⟩ | FIRST DETECTION TIME/DATE OF FRAME<br>TIME INFORMATION ON FIRST DETECTION OF FACE |
| FIRST FRAME INFORMATION ⟨start-frame⟩ | DETECTION FRAME COORDINATES (xs, ys, ws, hs)<br>DETECTION FRAME INFORMATION ON FIRST DETECTION OF FACE |
| LAST FRAME INFORMATION ⟨last-frame⟩ | DETECTION FRAME COORDINATES (xl, yl, wl, hl)<br>DETECTION FRAME INFORMATION ON FACE IN LAST FRAME |
| | CHASE TIME (ChaseTime)<br>CHASE TIME INFORMATION |
| SPECIFIC FRAME INFORMATION (1) ⟨bs-frame⟩ | FACE DETECTION FRAME INFORMATION (x, y, w, h)<br>DETECTION FRAME INFORMATION INVOLVING BEST FACE STATE IN SEQUENCE OF CHASES |
| | CHASE TIME (ChaseTime)<br>CHASE TIME UNTIL TIME OF BEST FACE STATE IN SEQUENCE OF CHASES |
| SPECIFIC FRAME INFORMATION (2) ⟨thumb-frame⟩ | THUMBNAIL FRAME INFORMATION (x', y', w', h')<br>FRAME INFORMATION ON THUMBNAIL AT SPECIFIC FRAME TIME |
| SPECIFIC FRAME INFORMATION (3) ⟨face-info⟩ | DETAILED INFORMATION ON FACE DETECTION FRAME (RELIABILITY, FACE DIRECTION INFORMATION)<br>DETAILED INFORMATION AT SPECIFIC FRAME TIME |
| SPECIFIC FRAME INFORMATION (4) ⟨bs-score⟩ | BEST SHOT SCORE<br>BEST SHOT SCORE VALUE WHEN SPECIFIC FRAME IS DETECTED |
| CHASE INFORMATION ⟨area-id⟩ | DETECTION ID (areaID) |

CAMERA DEVICE, SERVER DEVICE, IMAGE MONITORING SYSTEM, CONTROL METHOD OF IMAGE MONITORING SYSTEM, AND CONTROL PROGRAM OF IMAGE MONITORING SYSTEM

RELATED APPLICATIONS

This application is a Continuation of International Application No. PCT/JP2013/000624, filed Feb. 5, 2013, which claims the benefit of Japanese patent application No. 2012-022953, filed Feb. 6, 2012, the disclosures of which are incorporated by reference herein in their entireties.

TECHNICAL FIELD

The present invention relates to a camera apparatus, a server apparatus, an image monitoring system, an image monitoring system control method, and an image monitoring system control program that process a captured image.

BACKGROUND ART

Figure 1:
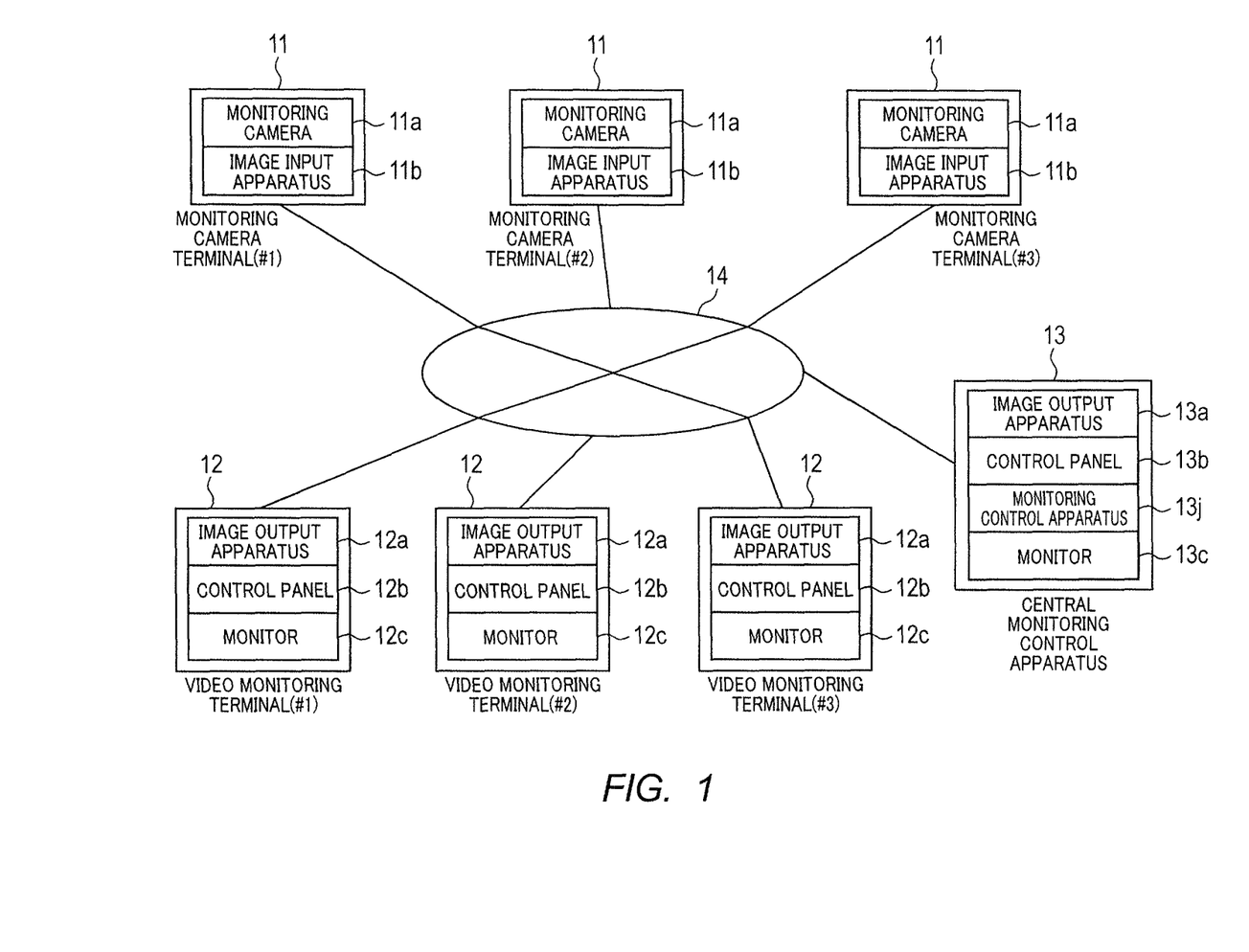
FIG. 1 is a block diagram illustrating an outline configuration of a conventional video monitoring system.

FIG. 1 is a block diagram illustrating an outline configuration of a conventional video monitoring system. In FIG. 1, the conventional video monitoring system can effectively use transmission capacity within a range not causing congestion in network 14, can cause video monitoring terminal 12 to receive a video signal with a high frame rate as appropriate, and includes a plurality of monitoring camera terminals 11, a plurality of video monitor stations 12, single central monitoring control apparatus 13, and network 14.

Monitoring camera terminal 11 includes monitoring camera 11a taking a video, and image input apparatus 11b encoding a video and transmitting the video to network 14.

Video monitoring terminal 12 includes image output apparatus 12a that receives video from network 14 and that decodes the video, monitor 12c that displays the decoded video, and control panel 12b that sets a frame rate defining the number of transmission frames per second and that sends the set value to central monitoring control apparatus 13 and monitoring camera terminal 11.

Central monitoring control apparatus 13 includes image output apparatus 13a that receives a video signal from monitoring camera terminal 11 and that decodes the video signal, monitor 13c that displays the decoded video, monitoring control apparatus 13j that receives the setting information from video monitoring terminal 12, that stores the frame rate and each connection destination representing which video monitoring terminal 12 monitors video transmitted from which monitoring camera terminal 11, and that monitors the communication state of a video signal, and control panel 13b that sets the frame rate and each connection destination representing which video monitoring terminal 12 monitors video transmitted from which monitoring camera terminal 11 in central monitoring control apparatus 13.

Upon reception of a request to set a new monitoring condition (a connection destination or a frame rate) from video monitoring terminal 12, monitoring control apparatus 13j determines whether it is possible to set the condition, sends the setting information to video monitoring terminal 12 and monitoring camera terminal 11, and thereby manages the transmission capacity of network 14 (for example, see Patent Literature (hereinafter, abbreviated as PTL) 1).

Figure 2:
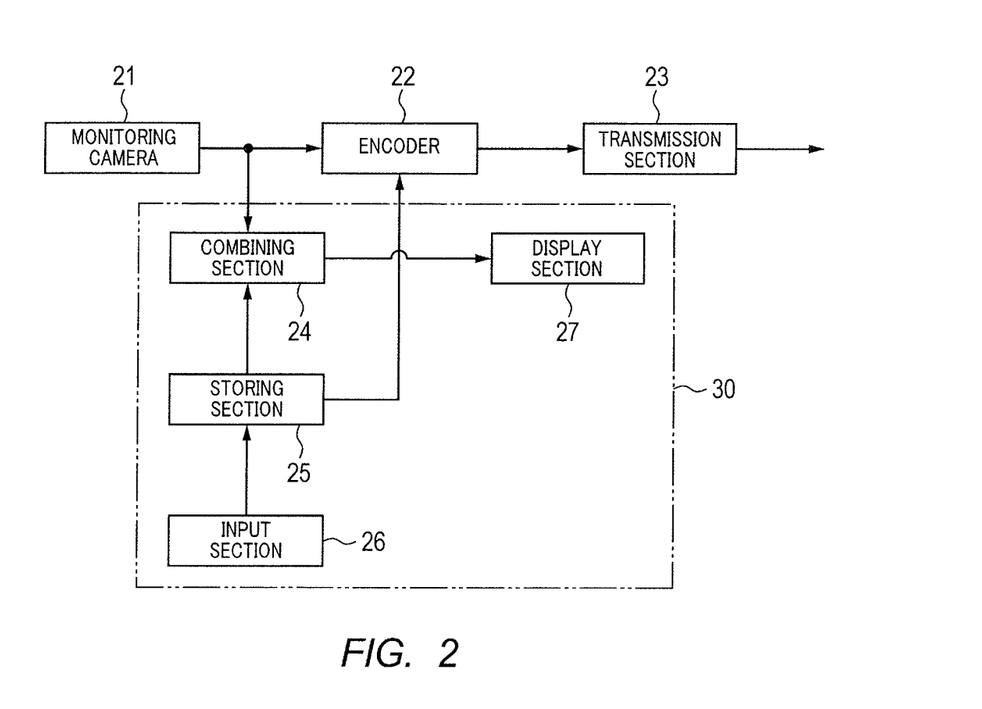
FIG. 2 is a block diagram illustrating an outline configuration of a conventional monitoring camera terminal.

FIG. 2 is a block diagram illustrating an outline configuration of monitoring camera terminal 11. In FIG. 2, monitoring camera terminal 11 includes monitoring camera 21 that captures monitoring video, encoder 22 that encodes a video signal, transmission section 23 that transmits a video signal to the network, and region division section 30 that specifies the importance of monitoring for each monitoring region. Monitoring camera terminal 11 thus enables encoding and transmission according to the importance of regions in the monitoring video.

Region division section 30 includes display section 27 that displays a moving image to be transmitted, input section 26 that includes a pointing device, such as a mouse, and that specifies a region and importance within an image, storing section 25 that holds the inputted region information and importance information, and combining section 24 that displays the region information and the importance by superimposing on an image as a difference in the brightness of the image.

Encoder 22 performs encoding using a different compression ratio for each region according to the region information and importance information stored in storing section 25 (for example, see PTL 2).

CITATION LIST

Patent Literature

PTL 1
Japanese Patent Application Laid-Open No. 2003-289528
PTL 2
Japanese Patent Application Laid-Open No. 2000-333156

SUMMARY OF INVENTION

Technical Problem

However, in techniques disclosed in PTL 1 and PTL 2, since data from a monitoring camera is transmitted fixedly, the use rate of a network band is always constant and cannot be reduced. For this reason, there is a problem in that the network band cannot be utilized efficiently. Moreover, bandwidths are uniformly allocated to monitoring cameras without taking into account the reliability of the data from each of the monitoring cameras, for example, so that the monitoring cameras continue transmitting unreliable unnecessary data, causing a problem in that the processing load of a server increases.

It is an object of the present invention to provide a camera apparatus, a server apparatus, an image monitoring system, an image monitoring system control method, and an image monitoring system control program that efficiently utilize a network band and decrease the processing load of a server.

Solution to Problem

A camera apparatus according to an aspect of the present invention includes: an imaging section that receives video from an imaging element; and a first image determination processing section that performs an image determination process on the captured video, that extracts a cutout image from the video, and that transmits the cutout image to a server apparatus when first reliability based on a first feature value of the video is equal to or greater than a first predetermined threshold.

A server apparatus according to an aspect of the present invention includes: a receiving section that receives a cutout image from a camera apparatus, the cutout image being extracted based on a first feature value from video captured by the camera apparatus; a second image determination processing section that evaluates second reliability based on a second feature value of the cutout image; a reliability determination section that performs a threshold determination between the second reliability and a predetermined second threshold; a load estimation section that estimates a processing load of the server apparatus and a network load between the server apparatus and the camera apparatus when the second reliability is less than the second threshold; and a retransmission request section that controls, according to the processing load and the network load, a retransmission request for the cutout image having the second reliability less than the second threshold.

An image monitoring system according to an aspect of the present invention includes: a camera apparatus: and a server apparatus, in which the camera apparatus includes: an imaging section that receives video from an imaging element; and a first image determination processing section that performs an image determination process on the captured video, that extracts a cutout image from the video, and that transmits the cutout image to a server apparatus, and the server apparatus includes: a second image determination processing section that evaluates second reliability based on a second feature value of the cutout image transmitted from the camera apparatus; a reliability determination section that performs a threshold determination between the second reliability and a predetermined second threshold; a load estimation section that estimates a processing load of the server apparatus and a network load between the server apparatus and the camera apparatus when the second reliability is less than the second threshold; and a retransmission request section that controls a retransmission request for the cutout image having the second reliability less than the second threshold according to the processing load and the network load.

An image monitoring system control method according to an aspect of the present invention includes: receiving, by a server apparatus, a cutout image extracted based on a first feature value from video captured by a camera apparatus; evaluating second reliability based on a second feature value of the cutout image transmitted from the camera apparatus; performing a threshold determination between the second reliability and a second predetermined threshold; estimating a processing load of the server apparatus and a network load between the server apparatus and the camera apparatus when the second reliability is less than the second threshold; and controlling, according to the processing load and the network load, a retransmission request for the cutout image having the second reliability less than the second threshold.

An image monitoring system control program according to an aspect of the present invention causes a computer to function as: a receiving section that receives a cutout image from a camera apparatus, the cutout image being extracted based on a first feature value from video captured by the camera apparatus; a second image determination processing section that evaluates second reliability based on a second feature value of the cutout image; a reliability determination section that perform a threshold determination between the second reliability and a predetermined second threshold; a load estimation section that estimates a processing load of an apparatus including the program and a network load between the server apparatus and the camera apparatus when the second reliability is less than the second threshold; and a retransmission request section that controls, according to the processing load and the network load, a retransmission request for the cutout image having the second reliability less than the second threshold.

Advantageous Effects of Invention

According to the present invention, it is possible to efficiently use a network band and also to decrease the processing load of a server.

BRIEF DESCRIPTION OF DRAWINGS

FIG. 4 illustrates examples of parameters;

DESCRIPTION OF EMBODIMENTS

Hereafter, each embodiment of the present invention will be described in detail with reference to the accompanying drawing.

Embodiment 1

Figure 3:
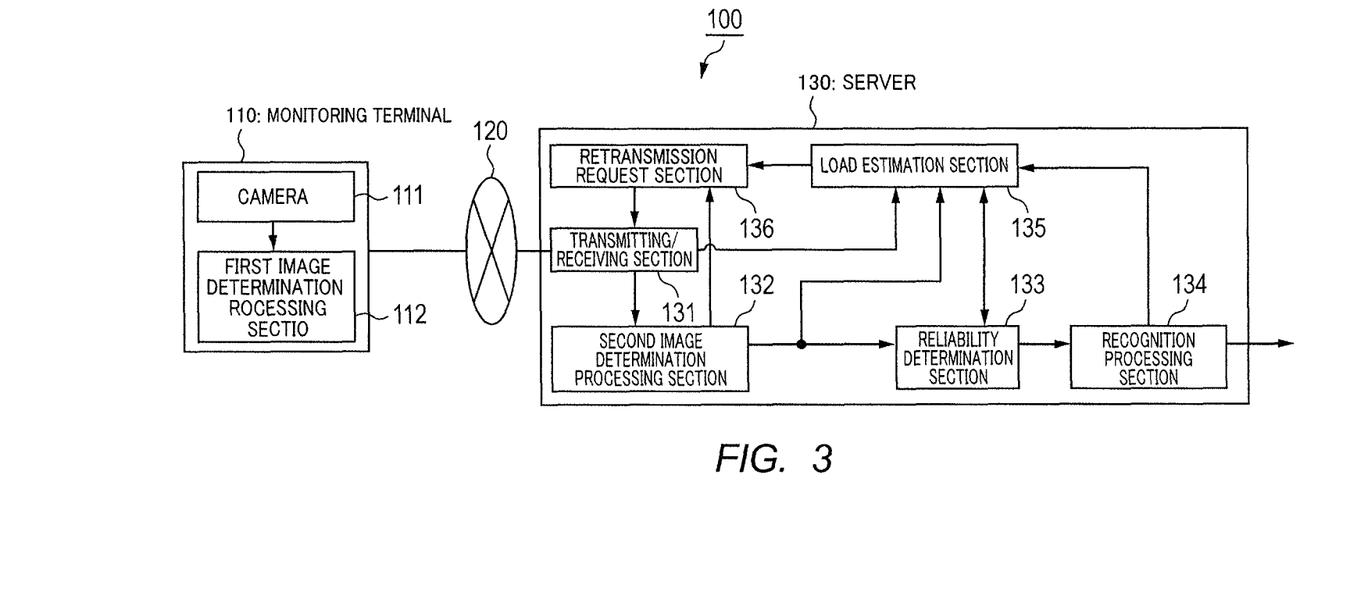
FIG. 3 is a block diagram illustrating an outline configuration of an image monitoring system according to Embodiment 1 of the present invention.

FIG. 3 is a block diagram illustrating an outline configuration of image monitoring system 100 according to Embodiment 1 of the present invention. In FIG. 3, image monitoring system 100 includes a plurality of monitoring terminals 110 (only one terminal is illustrated in the drawing), network 120, and cloud server (hereinafter, simply referred to as "server") 130.

Monitoring terminal 110 includes camera 111 and first image determination processing section 112. Camera 111 receives video from an image sensor, such as a CCD (Charge Coupled Device) or CMOS (Complementary Metal Oxide Semiconductor) sensor, and outputs the received video to first image determination processing section 112.

First image determination processing section 112 performs an image determination process on the video outputted from camera 111 and determines whether this image is transmitted to server 130. More specifically, for example, first image determination processing section 112 assigns a detection frame to a face candidate region that is an image region similar to a human face model. Raster scan is applied to a whole image region to derive the detection frame as a face candidate region and to extract a region including a human face as a cutout image (thumbnail). At this time, when the number of detection frames for detecting a human face (first feature value) appearing in a cutout image is equal to or greater than predetermined threshold Th1, first image determination processing section 112 determines to transmit this cutout image. On the other hand, when the number of detection frames is less than the predetermined threshold Th1, first image determination processing section 112 determines not to transmit this cutout image. In this case, the larger the number of detection frames, the higher the reliability (likelihood) will be, and a cutout image with certain reliability is transmitted to server 130.

First image determination processing section 112 transmits, together with a parameter, the cutout image involving the number of detection frames determined as being equal to or greater than threshold Th1 to server 130. Examples of this parameter include items illustrated in FIG. 4 such as an identification code and a state flag. The state flag represents the appearance, chasing, and disappearance of a detection target (a human face in this case).

Network 120 is a communication network interconnecting monitoring terminal 110 and server 130.

Server 130 includes transmitting/receiving section 131, second image determination processing section 132, reliability determination section 133, recognition processing section 134, load estimation section 135, and retransmission request section 136.

Transmitting/receiving section 131 receives a cutout image transmitted from monitoring terminal 110 and outputs the received cutout image to second image determination processing section 132. Transmitting/receiving section 131 also transmits a retransmission request outputted from retransmission request section 136 to monitoring terminal 110. Furthermore, transmitting/receiving section 131 receives propagation information used for the calculation of a propagation delay from monitoring terminal 110, and outputs the received propagation information to load estimation section 135.

Second image determination processing section 132 analyzes a cutout image outputted from transmitting/receiving section 131 and evaluates the quality (reliability) of the cutout image. More specifically, second image determination processing section 132 analyzes whether any face part characteristic exists in the cutout image. For example, second image determination processing section 132 preliminarily has an eye template, searches the inside of the region of a face part, and analyzes an eye position to find out whether any region similar to the template exists (second feature value). Alternatively, second image determination processing section 132 analyzes, for example, whether the cutout image has symmetry (second feature value) since a human face generally has bilateral symmetry. This result of analysis (reliability) is subjected to numerical conversion and is outputted as the analysis value to retransmission request section 136. In addition, the cutout image and the analysis value are outputted to reliability determination section 133. Second image determination processing section 132 outputs the CPU (Central Processing Unit) utilization required for the process to load estimation section 135.

Reliability determination section 133 performs a threshold determination between the analysis value outputted from second image determination processing section 132 and predetermined threshold Th2. When the analysis value is equal to or greater than threshold Th2, reliability determination section 133 outputs the analyzed cutout image to recognition processing section 134. On the other hand, when the analysis value is less than threshold Th2, reliability determination section 133 outputs the identification code of the analyzed cutout image to load estimation section 135. Reliability determination section 133 also outputs the CPU utilization required for the process to load estimation section 135.

Recognition processing section 134 performs a recognition process based on the cutout image outputted from reliability determination section 133. More specifically, for example, recognition processing section 134 performs a recognition process on the age, sexuality, and the like of a person appearing in the cutout image (third feature value), and reports information acquired through the recognition process to an operator or the like. Recognition processing section 134 also outputs the CPU utilization required for the process to load estimation section 135.

Load estimation section 135 sums the CPU utilizations outputted from second image determination processing section 132, reliability determination section 133, and recognition processing section 134, and estimates the CPU utilizations as the processing load of server 130. Load estimation section 135 obtains a delay time on the basis of the propagation information outputted from transmitting/receiving section 131, and estimates a network load from the obtained delay time. This delay time is obtained as, for example, the time difference (RTT: Round Trip Time) between the time of transmitting an ICMP (Internet Control Message Protocol) ECHO packet to a monitoring terminal and the arrival time of a response packet (ICMP REPLY) from this monitoring terminal, using "ping," which is an ICMP. The network load may be estimated from the absolute value of the RTT or a fluctuation (jitter). The detail of methods for estimating a network load is disclosed in, for example, Chapter 3 "Common Functions for Network Management" in 9 Part "Network Management" in 5 Group of "Knowledge Base" produced by the Institute of Electronics, Information and Communication Engineers (http://www.ieice-hbkb.org/files/05/05gun_09hen_03.pdf), and Japanese Patent Application Laid-Open No. 2004-23794.

Load estimation section 135 outputs the identification code outputted from reliability determination section 133, and the estimated server processing load and network load to retransmission request section 136.

Figure 5A:
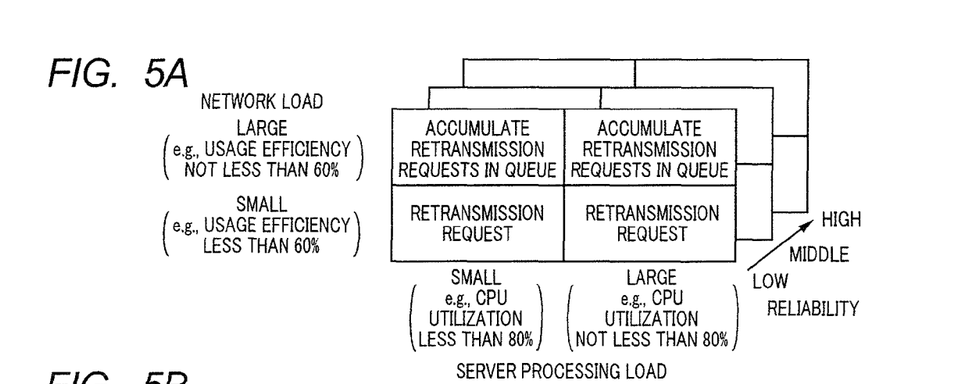
FIGS. 5A to 5D illustrate tables for a retransmission request control method.

Retransmission request section 136 controls a retransmission request for the identification code outputted from load estimation section 135 on the basis of the analysis value outputted from second image determination processing section 132, the server processing load and network load outputted from load estimation section 135. More specifically, as illustrated in FIG. 5A, for example, the retransmission request control method is predetermined in three types (high, middle, and low) of tables based on the reliability (analysis value), according to whether the server processing load involves a CPU utilization equal to or greater than 80% and whether the network load involves a network usage efficiency equal to or greater than 60%.

Figure 5B:
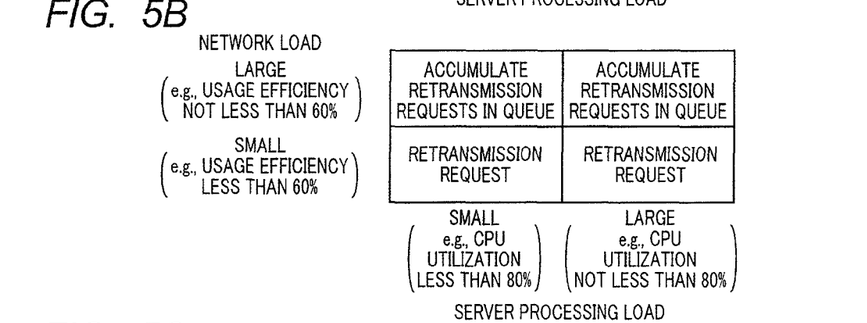

FIG. 5B illustrates a table of the retransmission request control method for low reliability. When the analysis value is low, it is preferred to perform as many retransmission requests as possible to acquire a new cutout image. Consequently, irrespective of the server processing load, the retransmission request is made when the network load is small, and the retransmission request is accumulated in a queue when the network load is large.

Figure 5C:
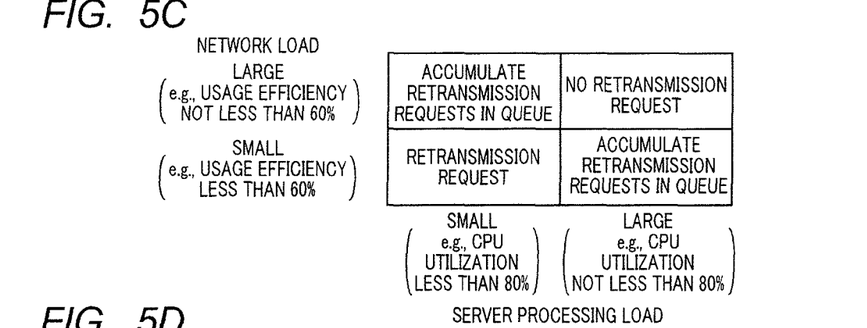

FIG. 5C illustrates a table of the retransmission request control method for middle reliability. When the analysis value is middle, a new cutout image is acquired when possible according to the server processing load and network load. Consequently, the retransmission request is made when the network load is small and the server processing load is small, and the retransmission request is accumulated in the queue when the network load is small and the server processing load is large. On the other hand, the retransmission request is accumulated in the queue when the network load is large and the server processing load is small, and no retransmission request is made when the network load is large and the server processing load is large.

Figure 5D:
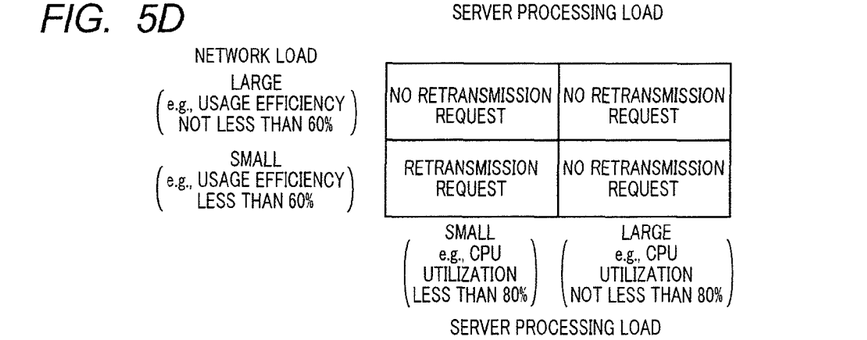

FIG. 5D illustrates a table of the retransmission request control method for high reliability. When the network load and the server processing load are large, it is preferred not to acquire a new cutout image. Consequently, only when the network load and the server processing load are small, the retransmission request is made; otherwise, no retransmission request is made.

For example, the retransmission request accumulated in the queue may be processed as follows: (1) transmit the retransmission request when a predetermined time period passes, (2) transmit the retransmission request when the network band is equal to or less than a predetermined value, or (3) transmit the retransmission request when the network load and/or the server processing load decreases.

In this way, the retransmission request can be controlled according to the network load and the server processing load to thereby control the transmission of the cutout image from the camera. This can control the network band and reduce the transmission of data with low reliability to therefore reduce the server processing load.

In this way, according to Embodiment 1, the server can evaluate the reliability of the cutout image transmitted from the monitoring terminal, control the retransmission request for the cutout image with low reliability according to the network load and the server processing load, thereby efficiently utilize the network band, and reduce the server processing load.

Although the present embodiment has been explained in the case where three kinds of tables of the retransmission request control method are prepared according to the analysis value, one kind of table may be used without taking into reliability account. In this case, the table of the retransmission request control method for the middle analysis value illustrated in FIG. 5B may be used.

Although the present embodiment has been explained in the case where threshold Th1 used in first image determination processing section of the monitoring terminal is a fixed threshold, the present invention is not limited to this case, and threshold Th1 may be variable according to the network load. For example, when the network load is high, threshold Th1 is raised to transmit a reliable cutout image to the server while preventing an increase in the transmission frequency for cutout images. When the network load is low, threshold Th1 is lowered to transmit a cutout image with certain reliability to the server and while increasing the transmission frequency for cutout images.

Alternatively, threshold Th1 may be variable according to the server processing load. For example, when the server processing load is high, threshold Th1 is raised to transmit a reliable cutout image to the server while preventing an increase in the transmission frequency for cutout images. When the server processing load is low, threshold Th1 is lowered to transmit a cutout image with certain reliability to the server while increasing the transmission frequency for cutout images.

Alternatively, threshold Th1 may be variable according to the quality of the cutout image transmitted from the monitoring terminal. When many cutout images have analysis values less than threshold Th2 in the reliability determination section of the server, the cutout images transmitted from the monitoring terminal are considered to have low quality, and threshold Th1 is thus raised.

The controlling of threshold Th1 described above may be performed for each identification code.

The present embodiment has been explained in the case where first image determination processing section 112 extracts a person as a cutout image while second image determination processing section 132 analyzes, for example, whether the person appearing in the cutout image includes the an eye position candidate or whether the cutout image has bilateral symmetry. However, the present invention is not limited to this case.

For example, first image determination processing section 112 may extract a portion with a motion as a cutout image, and second image determination processing section 132 may recognize whether the portion appearing on the cutout image is a person. When the portion appearing on the cutout image is not or unlikely to be a person, retransmission request section 136 makes a retransmission request.

Alternatively, first image determination processing section 112 may extract a quadrangle object as a cutout image, and second image determination processing section 132 may perform a number recognition process on the quadrangle object appearing on the cutout image. When the number appearing on the cutout image cannot be recognized or unlikely to be recognized, retransmission request section 136 makes a retransmission request.

Furthermore, first image determination processing section 112 may extract a portion with a motion as a cutout image, and second image determination processing section 132 may recognize whether the portion appearing on the cutout image is a car. When the portion appearing on the cutout image is not or is unlikely to be a car, retransmission request section 136 makes a retransmission request.

Embodiment 2

The configuration of an image monitoring system according to Embodiment 2 of the present invention is the same as the configuration illustrated in FIG. 3 of Embodiment 1, and will therefore be explained with reference to FIG. 3.

In Embodiment 2 of the present invention, a description will be specifically given of a human face detecting process in first image determination processing section 112 and an eye template matching process in second image determination processing section 132.

Figure 6A:
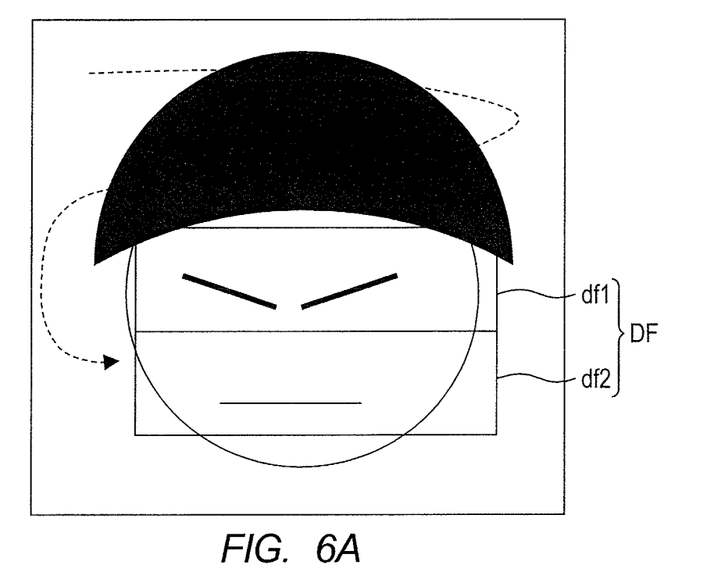
FIGS. 6A and 6B are provided for describing a human face detecting process in a first image determination processing section.
Figure 6B:
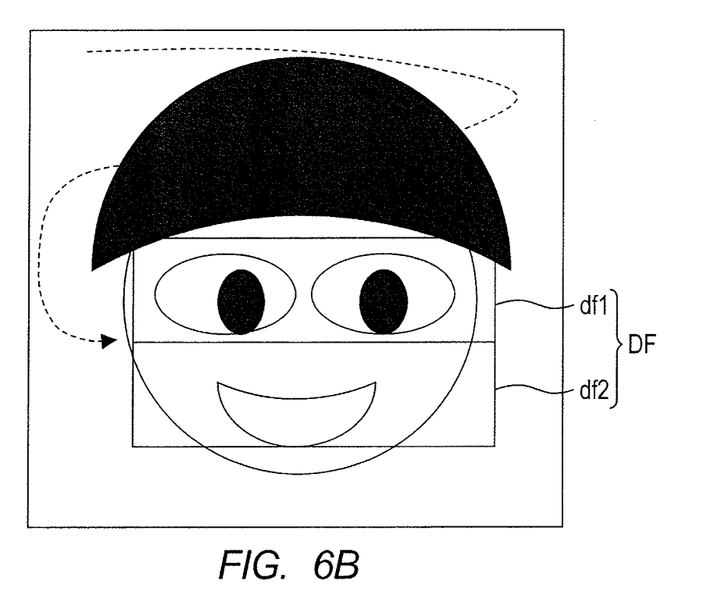

FIGS. 6A and 6B are provided for describing the human face detecting process in first image determination processing section 112. FIG. 6A illustrates face image A with closed eyes, and FIG. 6B illustrates face image B with open eyes.

First image determination processing section 112 applies rectangular detection frame DF to face image A and face image B. Detection frame DF includes upper detection frame df1, which is the upper half of detection frame DF and lower detection frame df2, which is the lower half thereof. Detection frame DF sequentially slides from the upper left to the right in the face image, slightly shifts downward at the right end, and slides from the left to the right in the face image again. At this time, first image determination processing section 112 finds a difference between the average of the intensity values of the pixels in upper detection frame df1 and the average of the intensity values of the pixels in lower detection frame df2, and determines that eyes are present in the image when the difference is larger than a predetermined threshold (see Viola-Jones' algorithm: Rapid Object Detection using a Boosted Cascade of Simple Features", Paul Viola, Michael Jones, Computer Vision and Pattern Recognition, 2001. CVPR 2001. Vol 1, P511-518).

In the case of face image A in FIG. 6A, the eyes are closed, but a forelock, eyebrows, or the like are present. As a result, since the difference between the average of the intensity values of the pixels in upper detection frame df1 and the average of the intensity values of the pixels in lower detection frame df2 is larger than the predetermined threshold when detection frame DF coincides with the position of the eyes, it can be determined that the eyes are present at the position of detection frame DF. Consequently, first image determination processing section 112 recognizes that a human face is detected. The averages of the intensity values of the pixels in upper detection frame df1 and lower detection frame df2 can be found just by calculating the sums and the differences of the intensity values of the pixels, and can therefore be found at a high speed.

In the case of face image B in FIG. 6B, the eyes are opened, and the irises of the eyes are imaged. As a result, since the difference between the average of the intensity values of the pixels in upper detection frame df1 and the average of the intensity values of the pixels in lower detection frame df2 is larger than the predetermined threshold when detection frame DF coincides with the position of the eyes, it can be determined that the eyes are present at the position of detection frame DF. Consequently, first image determination processing section 112 recognizes that a human face is detected.

In this way, first image determination processing section 112 can detect a face in both face image A of FIG. 6A and face image B of FIG. 6B, and the detected face image is sent from monitoring terminal 110 to server 130.

Figure 7A:
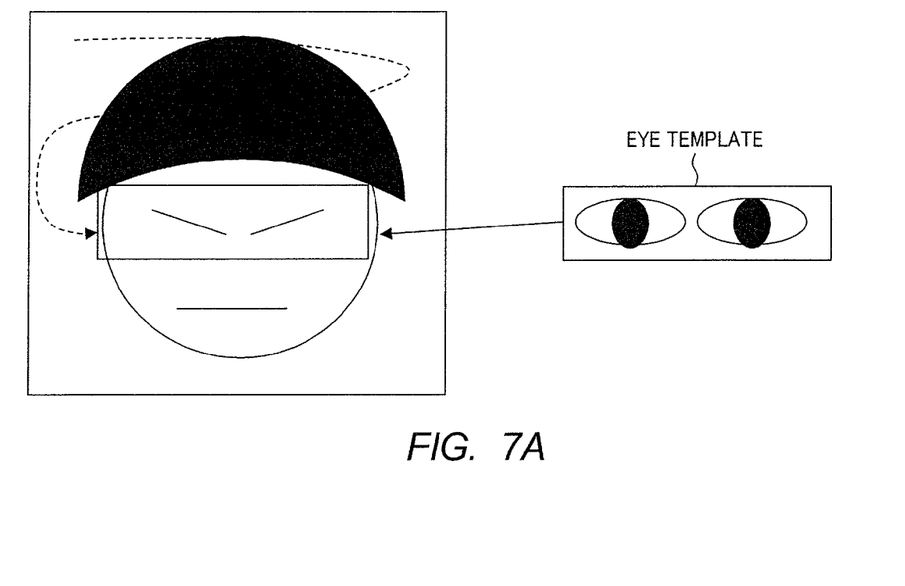
FIGS. 7A and 7B are provided for describing an eye template matching process in a second image determination processing section.
Figure 7B:
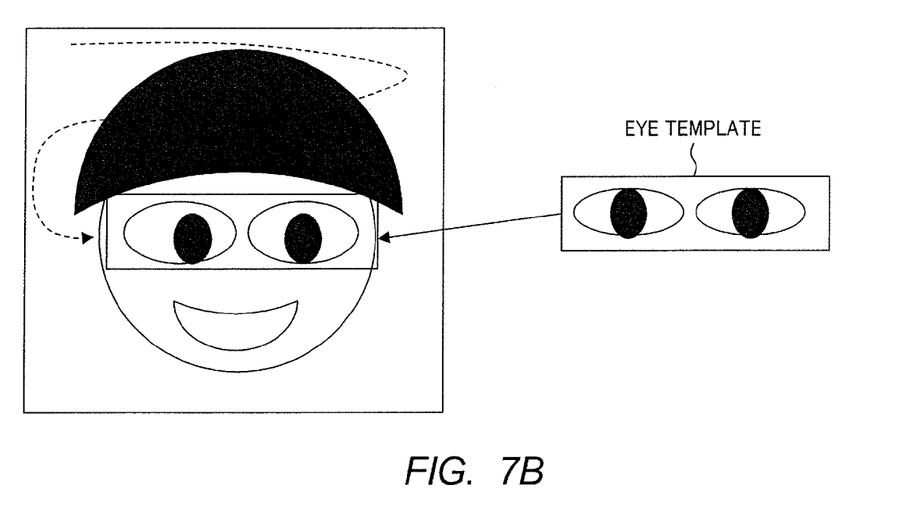

FIGS. 7A and 7B are provided for describing the eye template matching process in second image determination processing section 132. FIG. 7A illustrates face image A with closed eyes, and FIG. 7B illustrates face image B with open eyes.

Second image determination processing section 132 has an eye template and matches this eye template with face image A and face image B. In the matching process, the template may slide over the whole face image similarly to the human face detecting process in first image determination processing section 112, or the matching process may be performed based on the face position detected by first image determination processing section 112.

The template matching process compares the eye template and the face image with respect to the pixels. This comparison can be performed by, for example, an SSD (Sum of Squared Difference) method. When the result of the SSD is smaller than a predetermined threshold, it can be determined that eyes are present at the position of the template. Consequently, second image determination processing section 132 recognizes that a human face is detected.

In the case of face image A of FIG. 7A, since the eyes are closed, no eyes are detected, and therefore no face is detected. In the case of face image B of FIG. 7B, since the eyes are opened, eyes are detected, and therefore a face is detected.

As described above, second image determination processing section 132 can detect a face only from an image suitable for face recognition.

The disclosure of Japanese Patent Application No. 2012-022953, filed on Feb. 6, 2012, including the specification, drawings and abstract, is incorporated herein by reference in its entirety.

INDUSTRIAL APPLICABILITY

The camera apparatus, server apparatus, image monitoring system, image monitoring system control method, and image monitoring system control program that process are suitable for efficiently using the network band while reducing the processing load of the server.

REFERENCE SIGNS LIST

110 Monitoring terminal
111 Camera
112 First image determination processing section
120 Network
130 Server
131 Transmitting/receiving section
132 Second image determination processing section
133 Reliability determination section
134 Recognition processing section
135 Load estimation section
136 Retransmission request section

The invention claimed is:

1. A server, comprising:
a processor; and
a program that, when executed by the processor, causes the server to:
receive an image from a terminal;
evaluate reliability based on a feature value of the image;
perform a threshold determination between the reliability and a predetermined threshold;
estimate a processing load of the server and a network load between the server and the terminal when the reliability is less than the predetermined threshold; and
control, according to at least one of the processing load and the network load, a retransmission request for the image having the reliability less than the predetermined threshold.

2. The server according to claim 1, wherein the program further causes the server to perform a recognition process on another feature value of the image when the reliability is equal to or more than the predetermined threshold.

3. The server according to claim 1, wherein:
the retransmission request is made when the network load is small and the processing load is small;
the retransmission request is accumulated in a queue when the network load is small and the processing load is large, and when the network load is large and the processing load is small; and
the retransmission request is not made when the network load is large and the processing load is large.

4. The server according to claim 3, wherein the retransmission request is accumulated in the queue when a predetermined time period passes, when a network band is equal to or less than a predetermined network band, or when at least one of the network load and the processing load decreases.

5. The server according to claim 1, wherein the retransmission request is controlled based on the processing load, the network load, and the reliability.

6. The server according to claim 5, wherein the retransmission request is made irrespective of the processing load and the network load when the reliability is low, and when the reliability is high, the retransmission request is made only in a case where the processing load and the network load are small.

7. The server according to claim 2, wherein the feature value is obtained by comparison between the image and a template.

8. An image monitoring system, comprising:
a terminal; and
a server, wherein
the terminal transmits an image to the server, and
the server:
evaluates reliability based on a feature value of the image transmitted from the terminal;
performs a threshold determination between the reliability and a predetermined threshold;

estimates a processing load of the server and a network load between the server and the terminal when the reliability is less than the predetermined threshold; and controls, according to at least one of the processing load and the network load, a retransmission request for the image having the reliability less than the predetermined threshold.

9. A system control method comprising:

receiving, by a server, an image from a terminal;

evaluating reliability based on a feature value of the image transmitted from the terminal;

performing a threshold determination between the reliability and a predetermined threshold;

estimating a processing load of the server and a network load between the server and the terminal when the reliability is less than the predetermined threshold; and controlling, according to at least one of the processing load and the network load, a retransmission request for the image having the reliability less than the predetermined threshold.

10. The system control method according to claim 9, further comprising:

performing a recognition process on another feature value of the image when the reliability is equal to or greater than the predetermined threshold.

11. The system control method according to claim 9, wherein:

in the controlling of the retransmission request, the retransmission request is made when the network load is small and the processing load is small;

in the controlling of the retransmission request, the retransmission request is accumulated in a queue when the network load is small and the processing load is large, and when the network load is large and the processing load is small; and in the controlling of the retransmission request, the retransmission request is not made when the network load is large and the processing load is large.

12. The system control method according to claim 11, wherein, in the controlling of the retransmission request, the retransmission request accumulated in the queue is transmitted when a predetermined time period passes, when a network band is equal to or less than a predetermined network band, or when at least one of the network load and the processing load decreases.

13. The system control method according to claim 9, wherein, in the controlling of the retransmission request, the retransmission request is controlled based on the processing load, the network load, and the reliability.

14. The system control method according to claim 13, wherein, in the controlling of the retransmission request, the retransmission request is made irrespective of the processing load and the network load when the reliability is low, and when the reliability is high, the retransmission request is made only in a case where the processing load and the network load are small.

15. The system control method according to claim 10, wherein the feature value is obtained by comparison between the image and a template.

* * * * *